(No Model.) 2 Sheets—Sheet 1.
G. H. CROWLEY.
CAR COUPLING.
No. 488,987. Patented Jan. 3, 1893.
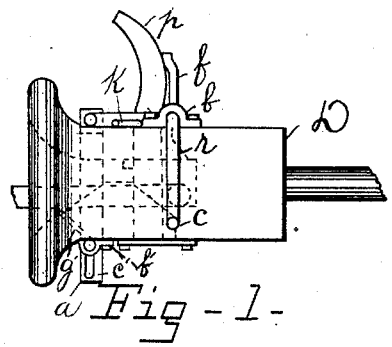
Fig-1-
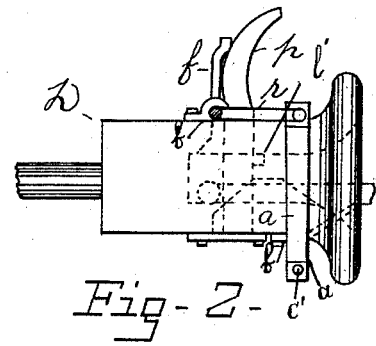
Fig-2-
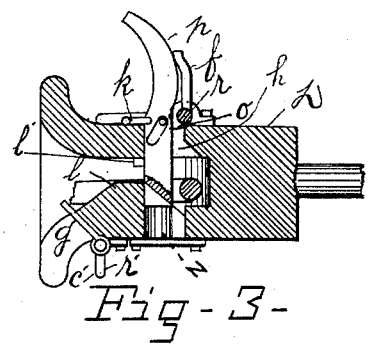
Fig-3-
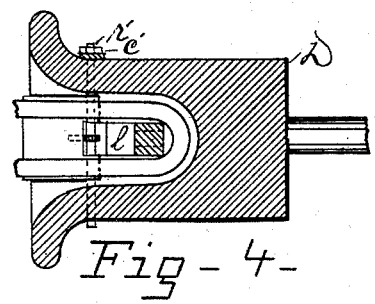
Fig-4-
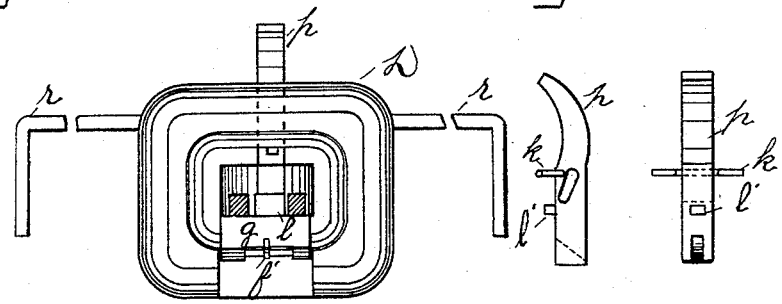
Fig-5- Fig-6- Fig-7-
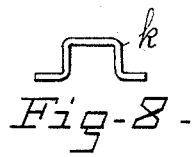
Fig-8-
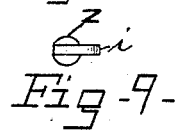
Fig-9-
Fig-10-
WITNESSES:
C. C. Woodworth
John B. Herbert
INVENTOR,
George H Crowley
BY L. W. Woodworth
ATTORNEY.

(No Model.) 2 Sheets—Sheet 2.
G. H. CROWLEY.
CAR COUPLING.
No. 488,987. Patented Jan. 3, 1893.
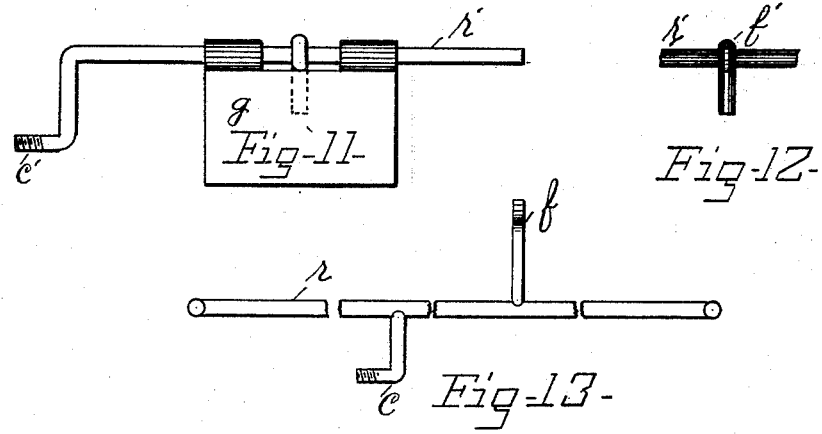
Fig-11.
Fig-12.
Fig-13.
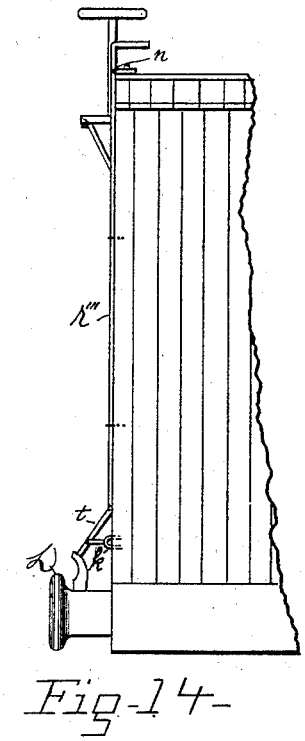
Fig-14.
WITNESSES:
C. C. Woodworth
John B Herbert
INVENTOR,
George H Crawley
BY
L. D. Woodworth
ATTORNEY.

UNITED STATES PATENT OFFICE.

GEORGE H. CROWLEY, OF YOUNGSTOWN, OHIO.

CAR-COUPLING.

SPECIFICATION forming part of Letters Patent No. 488,987, dated January 3, 1893.

Application filed March 18, 1892. Serial No. 425,496. (No model.)

*To all whom it may concern:*

Be it known that I, GEORGE H. CROWLEY, a citizen of the United States, residing at Youngstown, in the county of Mahoning and State of Ohio, have invented certain new and useful Improvements in Car-Couplers; and I do hereby declare the following to be a full, clear, and exact description of my invention, such as will enable others skilled in the art to which it appertains to make and use the same, reference being had to the accompanying drawings, which form part of this specification.

My invention relates to that class of car couplers, applied to freight cars, in which the link and pin are supposed to be controlled by mechanical appliances, and its object is a mechanism whereby in coupling and uncoupling cars the link and pin may be easily, certainly, and safely handled by the brakeman from positions on the ground at either car side, in the car, if a flat or gondola car, and on the roof, if a box car; and which, with all, is a mechanism that, using the usual link, is applied to the ordinary draw head, with some modifications, and in which the parts are of such forms, and for such functions, that they are very durable, thus providing a car coupler of great value as a time and labor saver, as well as a protector against the dangers to which brakemen are exposed in coupling and uncoupling cars. I accomplish this object by the mechanism hereinafter described and illustrated in the drawings, in which Figure 1 is a view of one side of the draw head D with my attachments in place shown interiorly by dotted lines; Fig. 2 is a similar view of the other side of the same; Fig. 3 is a vertical longitudinal view of the same on the line of one side of the pin $p$ that has place therein; Fig. 4 is a horizontal longitudinal view of the same on a line immediately above the link therein; Fig. 5 is a front or face view of the same; Fig. 6 is a side view of the pin $p$; Fig. 7 is a forward edge view of the same; Fig. 8 is a side view of the free pin fulcrum $k$; Fig. 9 is a top view of the pin seat incline $i$; Fig. 10 is a side view of the same in the pin seat $z$; Fig. 11 is a plan view of the sub combination consisting of the guide rod $r'$, the guide finger $f'$, and the guide $g$; Fig. 12 is a side view of the guide finger $f'$ in place on a section of the guide rod $r'$; Fig. 13 is a side view of the handle rod $r$, in broken sections, showing the crank $c$ and the finger $f$; and Fig. 14 is an elevation view of a section of a box car showing the vertical uncoupling rod $r'''$, the lever $t$, and the fulcrum $k'$.

Similar letters refer to similar parts in all views.

My coupler is used with the common draw head modified in its interior form, as will presently appear, constituting the draw-head D.

To supply a foot brace for the pin $p$ I provide the U shaped lift shoulder $l$ rising, breadth centrally, from the floor of the interior space of the drawhead D with a rear upward incline, beginning at the entrance, to an abrupt termination in a vertical edge, so that the link in its movement inward will glide up the same, and when its forward end passes the top will glide down the pin seat incline $i$ (to be described) to a position prone upon the floor, and clasping the lift shoulder $l$ within its opening.

The pin hole $h$ occupying the usual position in the draw head is rectangular, with a greater length than breadth, longitudinal with the draw head, its rear wall above the interior space having a rear downward bevel suitable to permit the movement of the pin $p$, to be described. In the pin hole $h$ below the floor is placed the pin seat $z$, supported by a plate attached with screws to the under surface of the draw head, into which, and aligned with the lift shoulder $l$, against which its longer perpendicular edge rests, is sunk the rectangular portion of the pin seat incline $i$, which is a flat piece of metal, rectangular in its lower and triangular in its upper portion, as shown at Fig. 10.

The pin $p$, shown separately at Fig. 6, is a square pin, the upper portion or the part appearing above the draw head D being curved slightly rearward and forward to be better actuated by the finger $f$ of the handle rod $r$, or by the foot or hand of the brakeman. In the pin $p$, its highest point on the lower line of the curvature appears the oblong, diagonal opening $o$, transverse with the draw head, and extending from its highest point downward and forward far enough to permit the movement of the pin $p$, as will be explained.

Through this opening $o$ passes a retaining pin, the ends of which are sunk into and held in the draw head. The pin fulcrum $k$ is a rod bent to a form representing three sides of a rectangle, the ends being similarly turned outward. The part opposite the open side passes rigidly through the pin $p$, transverse with the draw-head, a little above the opening $o$, its vertical parts inclining downward and its outwardly bent parts resting freely on the upper surface of the draw head D. On the forward side of the pin $p$, at a point that is immediately below the roof of the interior space in the draw head D when the pin $p$ is in place at a perpendicular, appears the lug $e$ by which when the coupling is made the pin $p$ is better secured in place. Centrally and in a forward and rearward line there is cut a triangular slot in the foot end of the pin $p$ in which rests the pin seat incline $i$ when the coupling is made. In the drawing at Fig. 3 to more clearly illustrate the positions of these parts a triangular portion of one side of the pin $p$ is represented as cut away showing the pin seat incline $i$ above the pin seat $z$.

The mechanism of my car coupler that is interior to the drawhead has now been described, and, before proceeding with a description of the exterior parts, their operation will be explained.

To open the coupler, permitting the rearward part of the link to glide up the pin seat incline $i$ and down the lift shoulder $s$ to an exit, forward pressure is applied to the curved part of the pin $p$, which, by action of the pin fulcrum $k$, lifts the pin and throws its foot back simultaneously, clearing the path for the link. When the pressure is withdrawn gravity returns the pin to the perpendicular. The operation to form a coupling is the same. The pressure that thus controls the pin $p$, if applied by my mechanism for operating it at a distance, also guides the link infallibly to an entrance into the draw-head. These parts of my invention will now be described.

The handle rod $r$ is a rod turned to right angles at both ends for handles, and which, extending from side to side of the car, crosses the drawhead D upon its upper side a little in rear of the pin $p$. It turns in the two bearing lugs $b$ $b$, which are cylinders having right and left side ears and are attached, one near each vertical side, by means of screws penetrating the ears, to the upper side of the draw head D. Midway between these two bearings and exactly in the rear of the pin $p$ appears the finger $f$, which is a short projection from the rod $r'$ to which it is rigidly attached. It is so placed that upon the turning of the handle rod $r$ its end strikes the curved part of the pin $p$ applying the pressure that moves it as has been shown.

On one side of the draw head D the crank $c$ extends from a rigid attachment to the handle rod $r$ to a pivotal connection with one end of the communicating arm $a$, the other end of which, at a point suitably lower than the under side of the draw head D, is pivotally attached to the sub crank $c'$ of the guide rod $r'$. The guide rod $r'$ is a rod extending across the under side of the draw head D, at a suitable location, to which it is held by the two bearing lugs $b'$ $b'$, similar to the bearing lugs $b$ $b$, and that appear, one near each vertical side of the draw head D, to which they are attached by screws. The lower lip of the draw head mouth is cut away rectangularly, preferably about the central one-third part of the whole, and within this space appears the link guide $g$, which is a flat rectangular piece of metal of suitable size having bearing attachments to the guide rod $r'$ near each corner of its inward edge. To lift the guide $g$ by turning the guide rod $r'$, the finger $f'$ rigidly attached to the guide rod $r'$ midway between the bearings of the guide $g$, extends for a short distance underneath the guide $g$.

It will be seen that, when the link of an approaching car nears the draw head D the brakeman may turn the rod $r$ by means of one of its cranks $c$ $c$ that are at the car sides bringing pressure by means of the finger $f$ upon the upper part of the pin $p$, thus clearing the way for the link, and, simultaneously, motion being communicated by the cranks $c$ $c'$ and the communicating arm $a$ to the guide rod $r'$ turns the latter lifting by means of the finger $f'$ the guide $g$, so that it guides the link, the end of which has lodged thereon, to an entrance into the draw head D.

To uncouple a box car from position on its roof I provide the vertical rod $r'''$, which having a bend for a handle at its upper end and the notch $n$ indented therein at a suitable distance below the handle to catch into a lip projecting from the car roof as a means of holding it in position, so that the brakeman by pushing the rod forward to disengage it from the catch, and then downward may, by the action of the lever $t$, apply to the curved part of the pin $p$ the pressure required to free the link. The rod $r'''$ is attached to the car side by staples.

My invention has now been fully described and its operation explained. I am aware that a rod carrying cranks at its ends, and used to move the parts of other car couplers, has been used, but I am not aware that such a rod provided with the finger $f$ and the crank $c$, nor that any other parts of my car coupler above described was ever known until my invention thereof.

What I claim is

1. In car couplers the draw head D having, the rectangular pin hole $h$ of greater space lengthwise with the draw head, the rear wall being upon a downward and rearward incline to the central opening, and provided upon the floor of its interior space with the lift shoulder $l$, beginning at the lip and rising, breadth centrally, with an upward and inward incline to an abrupt shoulder, of dimensions to be received within the opening of the link, substantially as described and for the purpose expressed.

2. In car couplers the flat rectangular piece of metal, rectangular in its lower and triangular in its upper portions, sunk centrally into a vertical slot in the pin seat $z$, its longer vertical edge against the vertical rear edge of the lift shoulder $l$, constituting the pin seat incline $i$, substantially as described and for the purpose expressed.

3. In car couplers the square pin $p$ curved forwardly in the part appearing above the draw head D and having immediately below the curved part and transverse to the drawhead, the diagonal and oblong opening $o$, substantially as described and for the purpose expressed.

4. In car couplers the handle rod $r$ passing from side to side of the car, above the draw head D on which it has bearings, bent to handles at each end, and provided at its length-center with the rigidly attached finger $f$, and, at a point near a vertical side of the drawhead D with the rigidly attached crank $c$, substantially as described and for the purpose expressed.

5. In car couplers the combination consisting of the guide rod $r'$, bent at one end to the crank $c'$, and carrying at its length center the rigidly attached finger $f'$, having bearings upon the under side of the draw head D; and the flat rectangular piece of metal in a space cut from the lower lip of the draw head D', constituting the link guide, and movably attached by bearings near the corners of one edge to the guide rod $r'$, the finger $f$ appearing between the bearings, substantially as described and for the purpose expressed.

6. In car couplers the combination of the drawhead D having the rectangular pin hole $h$, the rear wall in the upper part inclining to the rear and downward, and provided, breadth centrally, on the floor of its interior space with the lift shoulder $l$, beginning at the lip and inclining up and backward to a vertical shoulder; the flat piece of metal, rectangular in its lower and triangular in its upper portions, sunk into a central lengthwise slot in the pin seat $s$, its longer vertical edge against the shoulder of the lift shoulder $l$; the rod $r$ bent at the ends to handles, carrying the rigidly attached finger $f$ and crank $c$, and extending between the car sides above the draw head on which it has bearings; the arm $a$ connecting the cranks $c$ and $c'$; the guide rod $r'$ carrying at one end the crank $c'$ and centrally the finger $p'$ and extending transversely across and underneath the draw head on which it has bearings; the flat rectangular metal plate $g$ that forms the link guide appearing in a space central, cut in the lower lip of the draw head, attached by bearings to the rod $r'$; all substantially as described and for the purpose expressed.

7. In car couplers the combination consisting of the vertical rod $r'''$ movably attached to the car end by staples and having in its side the notch $n$ engaging a lip extending from the car roof above which it is bent to a handle; the lever $t$, at its upper end pivotally connected with the lower end of the rod $r''$, and which, having fulcrum by pivotal connection with the end of the short horizontal projection $k'$, extends to contact with the curved part of the pin $p$; and the horizontal projection from the car end $k'$ at its end pivotally connected with the body of the lever $t$, substantially as described and for the purpose expressed.

In testimony whereof I hereunto affix my signature in the presence of two witnesses.

GEORGE H. CROWLEY.

Witnesses:
LON BLACKBURN,
OLIF FULLWILER.